United States Patent
Ratnarajah et al.

(10) Patent No.: US 6,757,339 B1
(45) Date of Patent: Jun. 29, 2004

(54) MINIMUM MEAN-SQUARED ERROR BLOCK-DECISION FEEDBACK SEQUENCE ESTIMATION IN DIGITAL COMMUNICATION SYSTEMS

(75) Inventors: Tharmalingam Ratnarajah, Kanata (CA); Radde Majeed, Bellevue, WA (US); Nidham Ben Rached, Paris (FR)

(73) Assignee: Nortel Networks Limited, St. Laurent (CA)

(*) Notice: Subject to any disclaimer, the term of this patent is extended or adjusted under 35 U.S.C. 154(b) by 891 days.

(21) Appl. No.: 09/624,207

(22) Filed: Jul. 24, 2000

(51) Int. Cl.[7] .................................... H04B 3/30
(52) U.S. Cl. ..................... 375/308; 375/341
(58) Field of Search .................. 375/279, 308, 375/309, 329, 341

(56) References Cited

U.S. PATENT DOCUMENTS 6,078,629 A * 6/2000 Critchlow et al. ........... 375/308
6,201,839 B1 * 3/2001 Kavcic et al. ............... 375/341
6,278,899 B1 * 8/2001 Piche et al. .................. 700/44

FOREIGN PATENT DOCUMENTS

FR   9803680   3/1998   ............ H04J/13/02

OTHER PUBLICATIONS

G.D. Forney "Maximum–Likelihood Sequence Estimation of Digital Sequence in the Presence of Intersymbol Interference" IEEE Transactions on Information Theory, vol. IT–18, pp. 363–378, May 1972.

* cited by examiner

*Primary Examiner*—Emmanuel Bayard
*Assistant Examiner*—Dung X. Nguyen

(57) ABSTRACT

A method of estimating the sequence of transmitted symbols in a digital communication system is provided. By assuming that the transmitted symbols have a zero mean and a covariance matrix given by an identity matrix, as is the case in an EDGE communication system, the solution to the minimization of the expectation value of $\|\hat{\underline{s}}-\underline{s}\|^2$ always allows a lower triangular matrix to be found through Cholesky decomposition. The lower triangular matrix allows an efficient block decision-feedback sequence estimation to be carried out. The method is no more complex than the zero-forcing block decision-feedback sequence estimation technique, yet a solution always exists and performance is improved over the zero-forcing method.

27 Claims, 4 Drawing Sheets

MINIMUM MEAN-SQUARED ERROR BLOCK-DECISION FEEDBACK SEQUENCE ESTIMATION IN DIGITAL COMMUNICATION SYSTEMS

FIELD OF THE INVENTION

This invention relates to digital communication systems, and more particularly to the estimation of the sequence of transmitted symbols in such systems.

BACKGROUND OF THE INVENTION

In EDGE (Enhanced Data Rates for GSM Evolution) cellular communication systems a sequence of symbols is transmitted as an 8 Phase Shift Keying (8-PSK) modulated signal. The signal may propagate along several propagation paths to a receiver. If the time delay between the various propagation paths is comparable to the intersymbol period, then the signal received by the receiver will contain intersymbol interference. The attenuation along each path will vary, as will phase changes due to reflections, so the intersymbol interference will not be merely additive. In addition, the received signal will contain noise, which is assumed to be additive white Gaussian noise.

The receiver must estimate the transmitted sequence of symbols from the received sequence of signal samples. This is assisted by use of a data model. The received signal sample at any discrete time k can be modelled as $$x_k = \sum_{j=0}^{v} a_j s_{k-j} + n_k \in C$$

where $x_k$ is the received signal sample at time k, v is the number of additional paths being considered by the estimator, $a_j$ is the channel impulse response coefficient of the j-th path, $s_{k-j}$ is the actual symbol transmitted at time k−j, and $n_k$ is the additive white Gaussian noise. The channel impulse response coefficients are determined from training symbols embedded in the transmitted sequence. The receiver knows what transmitted training data to expect, and by comparing the expected training symbols with the training symbols actually received a least squared channel estimator can estimate the channel impulse response coefficients for temporally proximate symbols.

Using vector notation, the data model can be rewritten as $$x_k = \underline{a}\underline{s}_k + n_k$$

where $\underline{a}=[a_0, \ldots, a_v]$, and $\underline{s}=[s_k, \ldots, s_{k-v}]^T$. N+v consecutive received signal samples can be represented as a vector $\underline{x}=[x_1, \ldots, x_{N+v}]^T$. A stacked data model is then given by $$\underline{x} = A\underline{s} + \underline{n}$$

where $\underline{s}=[s_1, \ldots, s_N]^T$, $\underline{n}=[n_1, \ldots, n_{N+v}]^T$, and $$A = \begin{bmatrix} a_0 & 0 & 0 & \ldots & \ldots & 0 \\ a_1 & a_0 & 0 & \ldots & \ldots & 0 \\ a_2 & a_1 & a_0 & \ldots & \ldots & 0 \\ \vdots & \vdots & \vdots & \ddots & \ldots & \vdots \\ a_v & a_{v-1} & a_{v-2} & \ldots & \ddots & 0 \\ 0 & \vdots & \vdots & \ldots & \ldots & \vdots \end{bmatrix} \in C^{(N+v) \times N}$$

One method of estimating the transmitted sequence of symbols is the Maximum Likelihood Sequence Estimation (MLSE) method. For each of the possible transmitted symbols, the received signal is compared with the signal that should have been received if it was that symbol that had been transmitted. Based on these comparisons, the MLSE method then selects the symbol which was most likely to have been transmitted. The MLSE method is a very accurate sequence estimation method. However, the complexity of the MLSE method is proportional to the number of possible transmitted symbols raised to the power of the number of propagation paths being considered. In EDGE systems there are eight possible transmitted symbols and seven propagation paths are considered, and the complexity of the MLSE method makes it impractical.

A second method of estimating the transmitted symbols is the Zero-Forcing Block Linear Equalizer (ZF-BLE) method. In the ZF-BLE method, the quantity Q is minimized with respect to $\underline{s}$, where $$Q = \|\underline{x} - A\underline{s}\|_{R_{nn}}^2,$$

$R_{nn} = \epsilon\{\underline{n}\underline{n}^H\}$ is the covariance matrix of the noise, and the operator $\epsilon\{\ \}$ denotes the expectation value. The solution to this minimization is $$\underline{\hat{s}} = (A^H R_{nn}^{-1} A)^{-1} A^H R_{nn}^{-1} \underline{x}$$

where $\underline{\hat{s}}$ is the estimation of the sequence of transmitted symbols $\underline{s}$, and $A^H$ is the Hermitian (or conjugate transpose) of A.

An improvement over the ZF-BLE method is the Zero-Forcing Block Decision-Feedback Sequence Estimation (ZF-BDFSE) method. The ZF-BDFSE method attempts to simplify the processing required to be carried out by the receiver. The substitution $$A^H R_{nn}^{-1} A = L L^H$$

can be made, where L is a lower triangular matrix, $L^H$ is the Hermitian of L, and the product $LL^H$ is determined by Cholesky decomposition. The estimated sequence of symbols is then given by $$\underline{\hat{s}} = L^{-H} L^{-1} A^H R_{nn}^{-1} \underline{x}$$

Although $\underline{\hat{s}}$ could be calculated from this expression, the resulting values would lie on a continuum and would generally not match the discrete possible values of the transmitted symbols. However, if a vector $\underline{z}$ is defined as $$\underline{z} = L^{-1} A^H R_{nn}^{-1} \underline{x}$$

and a difference vector $\underline{\Delta}$ is defined as $$\underline{\Delta} = L^H \underline{\hat{s}} - \underline{z}$$

then the estimation of $\underline{\hat{s}}$ can be determined by minimizing the magnitude of the difference vector $\underline{\Delta}$ with respect to the vector of discrete possible values.

Although the ZF-BDFSE method is less complex than the MLSE method, and has improved performance over the ZF-BLE method, it has a weakness in that a Cholesky decomposition does not always exist. A matrix L can only be found if the channel impulse response correlation matrix is positive definite. To avoid this risk noise can be added to the channel impulse response correlation matrix, but this results in performance degradation. A method is required which does not have the complexity of the MLSE method, which maintains performance improvement over the ZF-BLE method, and for which a solution always exists without having to degrade performance by artificially adding noise.

SUMMARY OF THE INVENTION

The present invention provides a method of estimating a transmitted sequence of symbols from a received sequence of signal samples $\underline{x}$. Each symbol in the transmitted sequence of symbols is one of a set of discrete possible symbol values. The received sequence of signal samples is a combination of noise having a covariance matrix represented as $R_{nn}$ and of the transmitted sequence of symbols propagating along at least one path, the paths having a matrix of channel impulse response coefficients represented as A. The method comprises the steps of determining a lower triangular matrix L from the relationship $LL^H = A^H R_{nn}^{-1} A + I$ where I is an identity matrix, calculating a vector $\underline{z} = L^{-1} A^H R_{nn}^{-1} \underline{x}$, and determining an estimated sequence of symbols $\underline{\hat{s}}$ belonging to the set of discrete possible symbol values such that the square of the magnitude of a difference vector $L^H \underline{\hat{s}} - \underline{z}$ is minimized. The step of determining the estimated sequence of symbols can be carried out by minimizing each term in the expression for the square of the magnitude of the difference vector successively in order of increasing number of symbols needed to resolve the term. The method can be implemented in a processor in a receiver of a digital communication system.

The method provides improved performance over the ZF-BDFSE method without increasing complexity, thereby improving the quality of the signal or, alternatively, allowing lower mobile transmitted power to be used.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
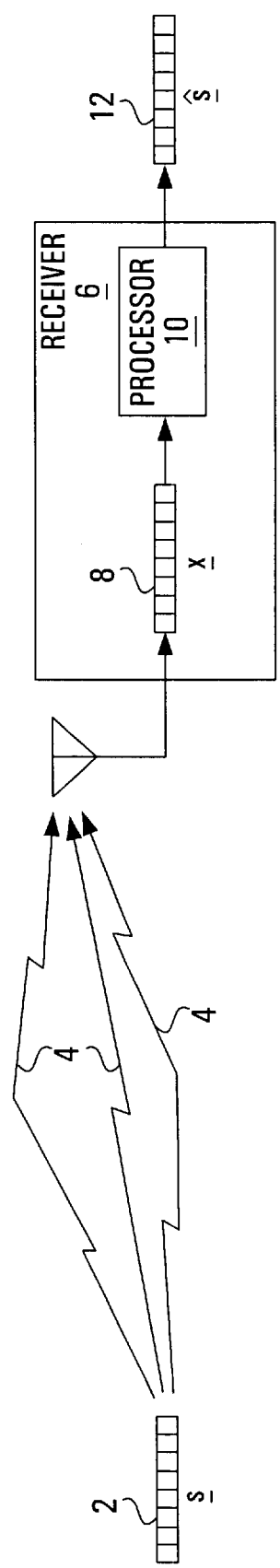
FIG. 1 is a block diagram illustrating a portion of a digital communication system which implements the invention.

Referring to FIG. 1, a signal composed of multiple slots is transmitted to a receiver. Each transmitted slot includes a transmitted sequence of symbols 2, which can be represented as a vector $\underline{s}$, a sequence of transmitted training symbols, and header and tail information. The signal may propagate along several paths 4, undergoing different amplitude and phase changes along each path before reaching the receiver 6. The receiver receives a received signal which it interprets as a series of received slots. Each received slot includes a received sequence of signal samples 8, which can be represented as a vector $\underline{x}$, a sequence of received training symbols, and header and tail information. The sequence of received signal samples $\underline{x}$ can be related to the sequence of transmitted symbols $\underline{s}$ using a data model $\underline{x} = A\underline{s} + \underline{n}$, where A is a matrix of channel impulse response coefficients, and $\underline{n}$ is a vector of additive white Gaussian noise.

If the vector $\underline{s}$ is presumed to have a distribution described by a mean $\underline{\mu}$ and a covariance matrix $R_{ss}$, then a digital signal processor 10 can determine an estimated sequence of symbols 12, represented by a vector $\underline{\hat{s}}$, which most closely matches $\underline{s}$ by minimizing the expectation value of $\|\underline{\hat{s}} - \underline{s}\|^2$. This has a well known solution of $$\underline{\hat{s}} = \underline{\mu} + (A^H R_{nn}^{-1} A + R_{ss}^{-1})^{-1} A^H R_{nn}^{-1} (\underline{x} - A\underline{\mu})$$

where $R_{nn}$ is the covariance matrix of the vector of noise $\underline{n}$ (and is usually assumed to be an identity matrix I multiplied by a noise variance $\sigma^2$), and $A^H$ is the Hermitian of the matrix A. For an 8-PSK communication system, such as an EDGE system, $\underline{\mu} = \underline{0}$ and $R_{ss} = I$, an identity matrix. Then $$\underline{\hat{s}} = (A^H R_{nn}^{-1} A + I)^{-1} A^H R_{nn}^{-1} \underline{x}$$

Figure 2:
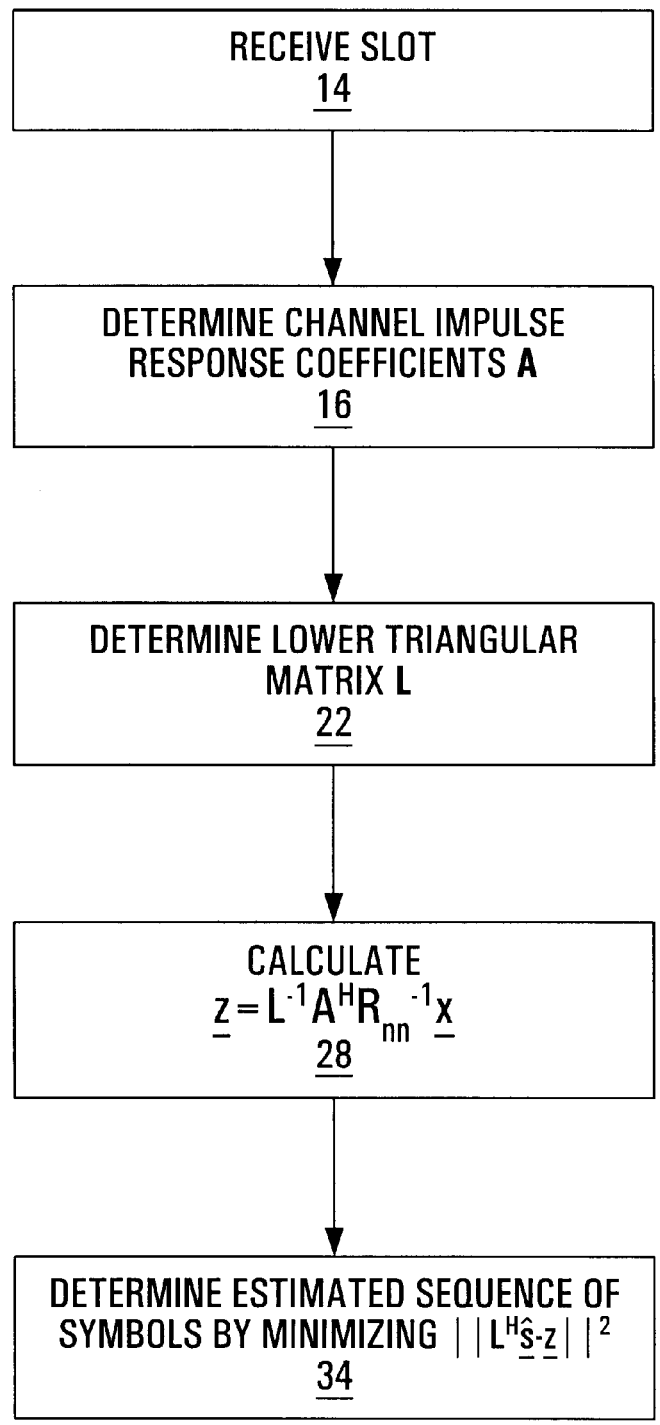
FIG. 2 is a flow chart showing the method of the invention.

FIG. 2 shows a flowchart of the method of the invention by which the processor determines the estimated sequence of symbols $\underline{\hat{s}}$ from the received sequence of sample signals $\underline{x}$. A slot is received at step 14. A least squared channel estimator determines A at step 16 from the sequence of received training symbols using well known techniques. At step 22 a product of triangular matrices $LL^H$ is found by performing a Cholesky decomposition, such that $$LL^H = A^H R_{nn}^{-1} A + I$$

Unlike in the ZF-BDFSE method, a solution to L always exists in the method of the invention. Substituting $LL^H$ into the solution for $\underline{\hat{s}}$, and multiplying both sides of the equation by $L^H$, it can be readily seen that $$L^H \underline{\hat{s}} = L^{-1} A^H R_{nn}^{-1} \underline{x}$$

At step 28 the vector $\underline{z}$, defined as $$\underline{z} = L^{-1} A^H R_{nn}^{-1} \underline{x}$$

is calculated. A difference vector $\underline{\Delta}$ can be defined as $$\underline{\Delta} = L^H \underline{\hat{s}} - \underline{z}$$

If the vectors and matrix are expanded, the square of the magnitude of this difference vector is seen to be $$\|\underline{\Delta}\|^2 = \left\| \begin{bmatrix} l_{11} & l_{12} & \cdots & l_{1N} \\ 0 & l_{22} & \cdots & l_{2N} \\ \vdots & \vdots & \ddots & \vdots \\ 0 & 0 & \cdots & l_{NN} \end{bmatrix} \begin{bmatrix} \hat{s}_1 \\ \hat{s}_2 \\ \vdots \\ \hat{s}_N \end{bmatrix} - \begin{bmatrix} z_1 \\ z_2 \\ \vdots \\ z_N \end{bmatrix} \right\|^2$$

and then $$\|\underline{\Delta}\|^2 = \|l_{NN}\hat{s}_N - z_N\|^2 + \|l_{N-1,N-1}\hat{s}_{N-1} + l_{N-1,N}\hat{s}_N - z_{N-1}\|^2 + \ldots + \left\| \sum_{j=i}^{N} l_{ij}\hat{s}_j - z_i \right\|^2 + \ldots + \left\| \sum_{j=1}^{N} l_{1j}\hat{s}_j - z_1 \right\|^2$$

For convenience, the terms in the above series will be referred to as $\Delta_N, \Delta_{N-1}, \ldots \Delta_1$.

At step 34 the terms in the expression for $\|\underline{\Delta}\|^2$ are minimized iteratively with respect to each possible discrete value of a transmitted symbol. The only unknown in the first term $\Delta_N$ is the value of the N-th estimated symbol $\hat{s}_N$. The term $\Delta_N$ is minimized by substituting in turn each possible value of the transmitted symbol into $\hat{s}_N$. The value which results in the lowest value of $\Delta_N$ is assigned to $\hat{s}_N$. The next term, $\Delta_{N-1}$, is minimized in the same way to find $\hat{s}_{N-1}$, using the value of $\hat{s}_N$ found when minimizing the previous term.

This process is repeated for each term until a value is found for each symbol ŝ in the estimated sequence of symbols. The actual transmitted sequence of symbols $\underline{s}$ is then presumed to be the complete estimated sequence of symbols $\underline{\hat{s}}$.

The above method minimizes the square of the magnitude of the difference vector with respect to the possible transmitted symbols one at a time. If a symbol is inaccurately estimated early in the method, this error will propagate through the estimation of the remaining symbols. The risk of this type of error can be reduced by grouping the vector and matrix elements in the expression $\|\underline{\Delta}\|^2$ into blocks. A term in the expression for $\|\underline{\Delta}\|^2$ can then be minimized with respect to several symbols simultaneously, yielding more accurate estimations. For example, if blocks of two elements are used, the matrix expression for $\|\underline{\Delta}\|^2$ becomes $$\|\underline{\Delta}\|^2 = \left\| \begin{bmatrix} L_{11} & L_{12} & \cdots & L_{1Q} \\ 0 & L_{22} & \cdots & L_{2Q} \\ \vdots & \vdots & \ddots & \vdots \\ 0 & 0 & \cdots & L_{QQ} \end{bmatrix} \begin{bmatrix} \underline{\hat{s}}_1 \\ \underline{\hat{s}}_2 \\ \vdots \\ \underline{\hat{s}}_Q \end{bmatrix} - \begin{bmatrix} \underline{z}_1 \\ \underline{z}_2 \\ \vdots \\ \underline{z}_Q \end{bmatrix} \right\|^2$$

and then $$\|\underline{\Delta}\|^2 = \|L_{QQ}\underline{\hat{s}}_Q - \underline{z}_Q\|^2 + \|L_{Q-1,Q-1}\underline{\hat{s}}_{Q-1} + L_{Q-1,Q}\underline{\hat{s}}_Q - \underline{z}_{Q-1}\|^2 + \cdots + \left\| \sum_{j=i}^{Q} L_{ij}\underline{\hat{s}}_j - \underline{z}_i \right\|^2 + \cdots + \left\| \sum_{j=i}^{Q} l_{1,j}\hat{s}_j - z_1 \right\|^2$$

where $Q=N/2$, $\underline{\hat{s}}_1=(\hat{s}_1, \hat{s}_2)$, ..., $\underline{\hat{s}}_Q=(\hat{s}_{N-1}, \hat{s}_N)$, $\underline{z}_1=(z_1, z_2)$, ..., $\underline{z}_Q=(z_{N-1}, z_N)$, and $$L_{11} = \begin{bmatrix} l_{11} & l_{12} \\ 0 & l_{22} \end{bmatrix}, \cdots L_{QQ} = \begin{bmatrix} l_{N-1,N-1} & l_{N-1,N} \\ 0 & l_{N,N} \end{bmatrix}$$

The first term, $\Delta_Q$ is minimized with respect to $\underline{\hat{s}}_Q$ by substituting each combination of two possible transmitted symbols into $\hat{s}_{N-1}$ and $\hat{s}_N$. The two values which result in the lowest value of $\Delta_Q$ are assigned to $\hat{s}_{N-1}$ and $\hat{s}_N$. The remaining terms are minimized in the same way, using the values of $\hat{s}$ previously determined. The transmitted sequence of symbols $\underline{s}$ is then presumed to be the complete estimated sequence of symbols $\underline{\hat{s}}$. Larger block sizes can yield more accurate estimations of the transmitted sequence. However since the number of combinations of symbol values which must be considered in minimizing each term is equal to the number of possible symbol values raised to the power of the size of the blocks, processing capabilities will limit the blocks to reasonable sizes (normally 3 or 4 for an 8-PSK communication system).

Either method can be generalized to receivers having multiple antennae. For example, in a receiver having two antennae the stacked data model can be written as $$\underline{x}_1 = A_1\underline{s} + \underline{n}_1$$

$$\underline{x}_2 = A_2\underline{s} + \underline{n}_2$$

where the subscript 1 refers to the signal received by the first antenna and the subscript 2 refers to the signal received by the second antenna. If it is assumed that there is no correlation between the noise received at each antenna and that the covariance matrix of the vectors of noise is given by $R_{n_1 n_1} = R_{n_2 n_2} = \sigma^2 I$, the triangular matrix L is now determined from $$LL^H = (A_1^H R_{n_1 n_1}^{-1} A_1 + A_2^H R_{n_2 n_2}^{-1} A_2 + I)$$

and the vector $\underline{z}$ is defined as $$\underline{z} = L^{-1}(A_1^H R_{n_1 n_1}^{-1} \underline{x}_1 + A_2^H R_{n_2 n_2}^{-1} \underline{x}_2)$$

The square of the magnitude of the difference vector $\underline{\Delta}$ is then minimized in the same manner as described above for the single antenna case, but using the values of $\underline{z}$ and $L^H$ calculated using the new expressions.

Figure 3:
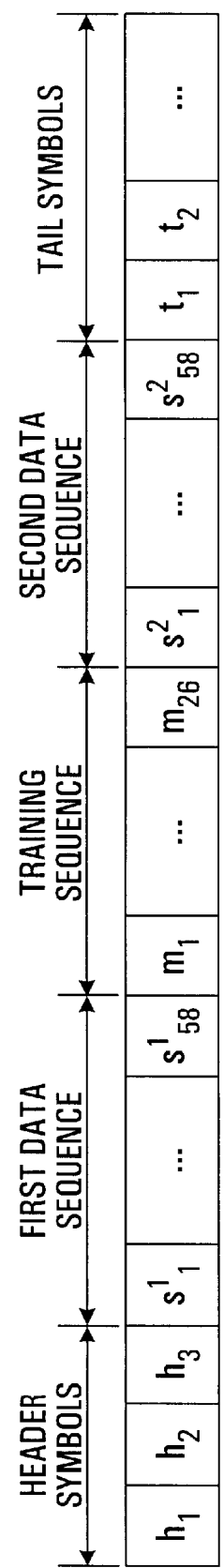
FIG. 3 is a diagram of a transmitted slot in an EDGE communication system.

For communication systems in which the transmitted sequence of symbols is transmitted along with a sequence of header symbols, a sequence of tail symbols, and the sequence of training symbols, pre-processing can be applied to the received sequence of signal samples to remove the interference effects of these additional known transmitted symbols on the received sequence of signal samples. For example, the transmitted slot in an EDGE communication system is shown in FIG. 3, in which there are two transmitted sequences of fifty-eight symbols (N=58). The following example assumes the number of additional propagation paths being considered is v=6, though in general there may be more or fewer. Considering first the first transmitted sequence of symbols, denoted in FIG. 3 by $s_i^1$, the intersymbol interference of the header symbols and the training symbols with the corresponding received sequence of signal samples can be removed using the expression $$\underline{x}_p^1 = \underline{x}(4:67) - \begin{bmatrix} M_1 \underline{h} \\ \underline{0} \\ M_2 \underline{m}^1 \end{bmatrix}$$

to generate a pre-processed received sequence of signal samples $\underline{x}_p^1$, where $\underline{x}(4:67)$ is the received sequence of N+v=64 signal samples ($\underline{x}(4:61)$ being the received signal samples corresponding to user data and $\underline{x}(62:67)$ being the received signal samples corresponding to training symbols), $\underline{0}$ is a vertical vector of zeros of length N−v, $\underline{h}=[h_1,h_2,h_3]^T$ is a vector of header symbols, $\underline{m}^1=[m_1, \ldots m_6]^T$ is a vector of v training symbols which interfere with the first transmitted sequence of symbols, and $M_1$ and $M_2$ are matrices given by $$M_1 = \begin{bmatrix} a_3 & a_2 & a_1 \\ a_4 & a_3 & a_2 \\ a_5 & a_4 & a_3 \\ a_6 & a_5 & a_4 \\ 0 & a_6 & a_5 \\ 0 & 0 & a_6 \end{bmatrix} \quad M_2 = \begin{bmatrix} a_0 & 0 & 0 & 0 & 0 & 0 \\ a_1 & a_0 & 0 & 0 & 0 & 0 \\ a_2 & a_1 & a_0 & 0 & 0 & 0 \\ a_3 & a_2 & a_1 & a_0 & 0 & 0 \\ a_4 & a_3 & a_2 & a_1 & a_0 & 0 \\ a_5 & a_4 & a_3 & a_2 & a_1 & a_0 \end{bmatrix}$$

where the matrix elements $a_i$ are the channel impulse response coefficients. Similarly for the second transmitted sequence of symbols, denoted in FIG. 3 by $s_i^2$, the intersymbol interference of the tail symbols and the training symbols with the corresponding received sequence of signal samples can be removed using the expression $$\underline{x}_p^2 = \underline{x}(88:151) - \begin{bmatrix} M_3 \underline{m}^2 \\ \underline{0} \\ M_2 \underline{t} \end{bmatrix}$$

to generate a pre-processed received sequence of signal samples $\underline{x}_p^2$, where $\underline{x}(88:151)$ is the received sequence of N+v=64 signal samples, $\underline{0}$ vertical vector of zeros of length N−v, $\underline{t}=[t_1, \ldots t_6]^T$ is a vector of tail symbols, $\underline{m}^2 = [m_{21}, \ldots m_{26}]^T$ is a vector of v training symbols which interfere with the second transmitted sequence of symbols, and $M_3$ is a matrix given by $$M_3 = \begin{bmatrix} a_6 & a_5 & a_4 & a_3 & a_2 & a_1 \\ 0 & a_6 & a_5 & a_4 & a_3 & a_2 \\ 0 & 0 & a_6 & a_5 & a_4 & a_3 \\ 0 & 0 & 0 & a_6 & a_5 & a_4 \\ 0 & 0 & 0 & 0 & a_6 & a_5 \\ 0 & 0 & 0 & 0 & 0 & a_6 \end{bmatrix}$$

Figure 4:
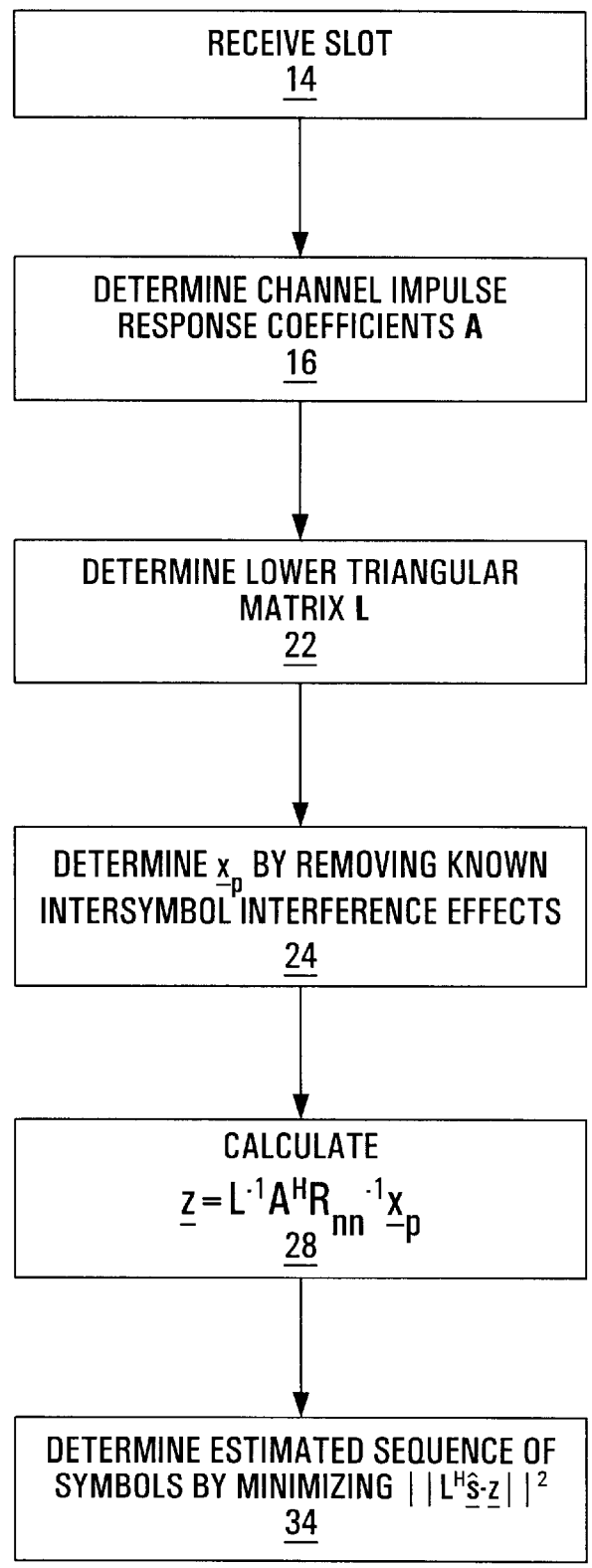
FIG. 4 is a flow chart showing an alternate method of the invention.

FIG. 4 shows a flowchart of the method of the invention when pre-processing is carried out. The pre-processing occurs at step 24, where $\underline{x}_p$ is calculated using the above expression which is appropriate to whether the received sequence of signal samples corresponds to the first transmitted sequence of symbols in the EDGE slot or to the second transmitted sequence of symbols in the EDGE slot. The remainder of the method is the same as that shown in FIG. 2, except that the pre-processed received sequence of signal samples $\underline{x}_p$ is used at step 28 to determine $\underline{z}$ instead of the unprocessed received sequence of signal samples $\underline{x}$. The method is applied to each of the two transmitted sequences of symbols within the EDGE slot. The method uses the same value of the matrix A for each of the two transmitted sequences of symbols, and only one Cholesky decomposition needs to be carried out to determine L for the two transmitted sequences. In other words, the method shown in FIG. 4 can determine the estimated sequence of symbols for both transmitted sequences of symbols of a slot by repeating only steps 24, 28 and 34.

The method is not confined to EDGE communication systems, nor even to 8-PSK communication systems, but can be applied in any communication system in which the transmitted symbols have a mean of 0 and a covariance matrix given by an identity matrix.

What has been described is merely illustrative of the application of the principles of the invention. Other arrangements and methods can be implemented by those skilled in the art without departing from the spirit and scope of the present invention.

We claim:

1. A method of estimating a transmitted sequence of symbols $\underline{s}$ from a received sequence of signal samples $\underline{x}$, each symbol in the transmitted sequence of symbols being one of a set of discrete possible symbol values, the received sequence of signal samples being a combination of noise having a covariance matrix represented as $R_{nn}$ and of the transmitted sequence of symbols propagating along a plurality of paths, the plurality of paths having a matrix of channel impulse response coefficients represented as A, the method comprising the steps of:

determining a lower triangular matrix L from the relationship $LL^H = A^H R_{nn}^{-1} A + I$ where $L^H$ is the Hermitian of L, $A^H$ is the Hermitian of A, and I is an identity matrix;

calculating a vector $\underline{z} = L^{-1} A^H R_{nn}^{-1} \underline{x}$; and determining an estimated sequence of symbols $\underline{\hat{s}}$ belonging to the set of discrete possible symbol values such that the square of the magnitude of a difference vector $L^H \underline{\hat{s}} - \underline{z}$ is minimized.

2. The method of claim 1 wherein the step of determining the estimated sequence of symbols is carried out by minimizing each term in the expression for the square of the magnitude of the difference vector successively in order of increasing number of symbols needed to resolve the term.

3. The method of claim 2 wherein a first term has an integral number of symbols needed to resolve the first term, and all other terms have a successively greater number of symbols needed to resolve the term equal to the integral number of symbols needed to resolve the first term.

4. The method of claim 3 wherein the integral number of symbols needed to resolve the first term larger than one.

5. The method of claim 1 wherein the transmitted sequence of symbols is received by a plurality of antennas as a plurality of corresponding received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

6. The method of claim 2 wherein the transmitted sequence of symbols is received by a plurality of antennas as a plurality of corresponding received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

7. The method of claim 3 wherein the transmitted sequence of symbols is received by a plurality of antennas as a plurality of corresponding received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

8. The method of claim 4 wherein the transmitted sequence of symbols is received by a plurality of antennas as a plurality of corresponding received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

9. The method of claim 1 wherein the step of determining the lower triangular matrix L is followed by the step of removing interference from header symbols, tail symbols, or training symbols to produce a pre-processed received sequence of signal samples $\underline{x}_p$, and the vector $\underline{z}$ is calculated from the expression $\underline{z} = L^{-1} A^H R_{nn}^{-1} \underline{x}_p$.

10. For a receiver in a digital communication system, the receiver receiving a received sequence of signal samples $\underline{x}$, a processor containing instructions for estimating a transmitted sequence of symbols $\underline{s}$, each symbol in the transmitted sequence of symbols being one of a set of discrete possible symbol values, the received sequence of signal samples being a combination of noise having a covariance matrix represented as $R_{nn}$ and of the transmitted sequence of symbols propagating along a plurality of paths, the plurality of paths having a matrix of channel impulse response coefficients represented as A, the instructions comprising:
instructions for determining a lower triangular matrix L from the relationship $LL^H = A^H R_{nn}^{-1} A + I$ where $L^H$ is the Hermitian of L, $A^H$ is the Hermitian of A, and I is an identity matrix;
instructions for calculating a vector $\underline{z} = L^{-1} A^H R_{nn}^{-1} \underline{x}$; and
instructions for determining an estimated sequence of symbols $\underline{\hat{s}}$ belonging to the set of discrete possible symbol values such that the magnitude of a difference vector $L^H \underline{\hat{s}} - \underline{z}$ is minimized.

11. The processor of claim 10 wherein the instructions for determining the estimated sequence of symbols comprise instructions for minimizing each term in the expression for the square of the magnitude of the difference vector successively in order of increasing number of symbols needed to resolve the term.

12. The processor of claim 11 wherein a first term has an integral number of symbols needed to resolve the first term, and all other terms have a successively greater number of symbols needed to resolve the term equal to the integral number of symbols needed to resolve the first term.

13. The processor of claim 12 wherein the integral number of symbols needed to resolve the first term larger than one.

14. The processor of claim 10 wherein the transmitted sequence of symbols is received by a plurality of antennas as a plurality of corresponding received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

15. The processor of claim 11 wherein the transmitted sequence of symbols is received by a plurality of antennas as a plurality of corresponding received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

16. The processor of claim 12 wherein the transmitted sequence of symbols is received by a plurality of antennas as a plurality of corresponding received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

17. The processor of claim 13 wherein the transmitted sequence of symbols is received by a plurality of antennas as a plurality of corresponding received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

18. The processor of claim 10 further comprising instructions for removing interference from header symbols, tail symbols, or training symbols to produce a pre-processed received sequence of signal samples $\underline{x}_p$, and the vector $\underline{z}$ is calculated from the expression $\underline{z} = L^{-1} A^H R_{nn}^{-1} \underline{x}_p$.

19. For a receiver in a digital communication system, the receiver receiving a received sequence of signal samples $\underline{x}$, apparatus for estimating a transmitted sequence of symbols $\underline{s}$, each symbol in the transmitted sequence of symbols being one of a set of discrete possible symbol values, the received sequence of signal samples being a combination of noise having a covariance matrix represented as $R_{nn}$ and of the transmitted sequence of symbols propagating along a plurality of paths, the plurality of paths having a matrix of channel impulse response coefficients represented as A, the apparatus comprising:
means for determining a lower triangular matrix L from the relationship $LL^H = A^H R_{nn}^{-1} A + I$ where $L^H$ is the Hermitian of L, $A^H$ is the Hermitian of A, and I is an identity matrix;
means for calculating a vector $\underline{z} = L^{-1} A^H R_{nn}^{-1} \underline{x}$; and
means for determining an estimated sequence of symbols $\underline{\hat{s}}$ belonging to the set of discrete possible symbol values such that the square of the magnitude of a difference vector $L^H \underline{\hat{s}} - \underline{z}$ is minimized.

20. The apparatus of claim 19 wherein the means for determining the estimated sequence of symbols comprise means for minimizing each term in the expression for the square of the magnitude of the difference vector successively in order of increasing number of symbols needed to resolve the term.

21. The apparatus of claim 20 wherein a first term has an integral number of symbols needed to resolve the first term, and all other terms have a successively greater number of symbols needed to resolve the term equal to the integral number of symbols needed to resolve the first term.

22. The apparatus of claim 21 wherein the integral number of symbols needed to resolve the first term larger than one.

23. The apparatus of claim 19 wherein the transmitted sequence of symbols is received by a plurality of antennas as a corresponding plurality of received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

24. The apparatus of claim 20 wherein the transmitted sequence of symbols is received by a plurality of antennas as a corresponding plurality of received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

25. The apparatus of claim 21 wherein the transmitted sequence of symbols is received by a plurality of antennas as a corresponding plurality of received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

26. The apparatus of claim 22 wherein the transmitted sequence of symbols is received by a plurality of antennas as a corresponding plurality of received sequences of signal samples $\underline{x}_i$, the lower triangular matrix L is determined from the relationship $$LL^H = \sum_i (A_i^H R_{n_i n_i}^{-1} A_i) + I$$

and the vector $\underline{z}$ is determined from the relationship $$z = L^{-1} \sum_i (A_i^H R_{n_i n_i}^{-1} \underline{x}_i).$$

27. The apparatus of claim 19 further comprising means for removing interference from header symbols, tail symbols, or training symbols to produce a pre-processed received sequence of signal samples $\underline{x}_p$, and the vector $\underline{z}$ is calculated from the expression $\underline{z} = L^{-1} A^H R_{nn}^{-1} \underline{x}_p$.

* * * * *